United States Patent [19]
Müller et al.

[11] 4,422,321
[45] Dec. 27, 1983

[54] COMBUSTION PROCESS SENSOR CONSTRUCTION

[75] Inventors: Klaus Müller, Tamm; Franz Rieger, Aalen-Wasseralfingen, both of Fed. Rep. of Germany

[73] Assignee: Robert Bosch GmbH, Stuttgart, Fed. Rep. of Germany

[21] Appl. No.: 314,651

[22] Filed: Oct. 26, 1981

[30] Foreign Application Priority Data

Nov. 11, 1980 [DE] Fed. Rep. of Germany ....... 3042399

[51] Int. Cl.³ .............................................. G01L 23/22
[52] U.S. Cl. ........................................ 73/35; 350/96.2
[58] Field of Search ............................ 73/35; 250/227; 313/129; 350/96.2, 96.22; 356/43, 44

[56] References Cited

U.S. PATENT DOCUMENTS

| | | | |
|---|---|---|---|
| 2,060,680 | 11/1936 | Linse | 313/129 |
| 2,567,036 | 9/1951 | Shannon | 350/96.2 X |
| 2,841,979 | 7/1958 | Harbert | 73/35 |
| 3,517,247 | 6/1970 | Szilagyi | 73/35 X |
| 4,139,260 | 2/1979 | Bouygues et al. | 350/96.22 |
| 4,181,397 | 1/1980 | Baker et al. | 350/96.2 |
| 4,358,952 | 11/1982 | Maurer et al. | 73/35 |

FOREIGN PATENT DOCUMENTS 496108 4/1930 Fed. Rep. of Germany ...... 313/129

*Primary Examiner*—S. Clement Swisher
*Assistant Examiner*—John E. Chapman, Jr.
*Attorney, Agent, or Firm*—Frishauf, Holtz, Goodman & Woodward

[57] ABSTRACT

To sense light and light variations emanating from a flame upon occurrence of combustion in the combustion chamber of an internal combustion engine, and prevent contamination of the sensing window, a quartz-glass rod is fitted into a housing with a central opening therethrough, the quartz-glass rod being exposed to the interior of the combustion chamber, and pressed against the housing by an abutment sleeve secured in the housing by a rolled-over shoulder. The quartz-glass rod is in light-transmissive relation, for example in contact with a fiber optic cable.

18 Claims, 2 Drawing Figures

COMBUSTION PROCESS SENSOR CONSTRUCTION

Reference to related application, assigned to the assignee of this invention:

U.S. Ser. No. 214,481, filed Dec. 9, 1980, MULLER, LINDER & MAURER and now U.S. Pat. No. 4,393,687.

The present invention relates to a combustion process sensor construction and more particularly to a combustion process sensor which is adapted to be inserted through the cylinder head of an internal combustion engine, which may be an Otto-type engine or a Diesel-type engine, and which includes a light guide element to permit viewing of the actual combustion process which occurs upon ignition of the air-fuel mixture within the combustion chamber of the engine.

BACKGROUND

It is desirable to determine the occurrence of various physical parameters during the combustion phase of the air-fuel mixture occurring within the combustion chamber of an internal combustion engine. Preferably, the combustion process with respect to time should be observed during actual operation of the engine. Observation may, for example, extend to the temporal and geometric distribution of the flame occurring during combustion; sensing of the ignition instant, sensing of fuel injection or supply processes; and, especially, sensing of undesirable or irregular combustion processes.

Irregular combustion may result in knocking of the engine. Such knocking occurs under certain operating conditions. Knocking, as usually understood, is caused by oscillations within the audible frequency band of the compressed fuel-air mixture which is triggered by a shock wave. The heat transmission to the piston walls and cylinder walls of the engine is substantially increased during such oscillations. A thermal overload of the surfaces will result, so that knocking should be avoided. For most efficient operation of the engine, it is desirable to utilize the working range of the engine to the greatest possible extent and, therefore, the engine should be operated just below the "knocking limit". It is necessary to have some means which early and reliably indicate knocking or a tendency to knock, so that the operating parameters of the internal combustion (IC) engine can then be so controlled that the engine will operate just below the knocking limit.

Various types of sensors to determine knocking have been proposed. Mechanical systems which sense the transferred oscillations to the engine, for example using a piezoelectric sensor, are easily made but have the disadvantage that such systems are difficult to operate reliably and free from interference and stray signals, since they also may respond to externally generated jolts and oscillations which arise in the operation of a vehicle to which the engine may be coupled, for example over bad roads or corrugated roads.

It has also been proposed to sense and observe the combustion process by optical means. An optical sensor and background literature are described in the cross-referenced application, assigned to the assignee of the present application, Ser. No. 214,481, filed Dec. 9, 1980 by MULLER et al. and now U.S. Pat. No. 4,393,687. This application discloses a sensor which includes light guide fibers or filaments which are positioned to sense the combustion event optically, the light guides being connected to a photoelectric transducer which, in turn, provides output signals to a tuned or filter circuit which is responsive to or tuned to expected knocking frequency to provide an output signal if shock waves occurring within the combustion chamber are of a frequency which results in engine knocking. Of course, the signals derived from the photoelectric transducer can be processed in any desired manner. The aforementioned patent application further describes integrating the light guide with a spark plug of an internal combustion engine, or to place light guides in the cylinder head gasket or seal, for eventual connection to photoelectric transducers.

Sensing physical parameters occurring with the combustion chamber of an IC engine by optical means causes problems: The optical element which faces the combustion, chamber, for example a glass rod, a fiber cable, or the like, will become dirty or blackened during operation, particularly upon extended operation, so that effective output and suitable measuring and evaluation of the light output become difficult, and in a limiting case even impossible after some operating time. Various proposals have been made to keep the side of the light guide facing the combustion chamber clean, or to so position and shape that portion of the light guide that it will be subjected to flushing action by induced fuel, swirling air-fuel gases, and the like, to thereby maintain the optical transmissivity thereof.

One of the difficulties which arise is that ordinary glasses which can provide windows to the light guides can be used only in the "cold" area of a sensor secured through a cylinder head of the IC engine, that is, at the side of the sensor remote from the combustion chamber since the heat during combustion will cause the glasses to melt. The glasses, however, being exposed to the combustion gases, will be subjected to fogging and deposits from combustion residues which will precipitate preferentially on the "cold" surface of the window, that is, cold with respect to combustion temperature. Yet, ordinary glasses have the advantage that they can be melted into a fitting or socket to be both gas-tight as well as pressure resistant to the high operating pressures arising within the combustion chamber. Light guides made of quartz-glass are temperature-stable, but cannot be placed in a sensor housing and secured by a melt connection.

THE INVENTION

It is an object to provide a sensor construction in which combustion processes can be observed optically and which does not result in contamination or blackening of a viewing window to the extent that observation is substantially impaired during an acceptable operating time.

Briefly, a quartz-glass rod is placed in a housing which, generally, may be similar to a spark plug housing, and exposed to view the combustion process. The quartz-glass rod is held within the housing by being clamped between an in-turned abutment or shoulder therein and a compression sleeve. The quartz-glass rod is in light transmitting relationship to a fiber optical cable which, in turn, can be connected to transmit light to a photoelectric transducer.

The sensor has the advantage that physical events and processes occurring in the combustion chamber of the IC engine can be optically determined with only minimum contamination or blackening of the window.

DRAWING

Figure 1:
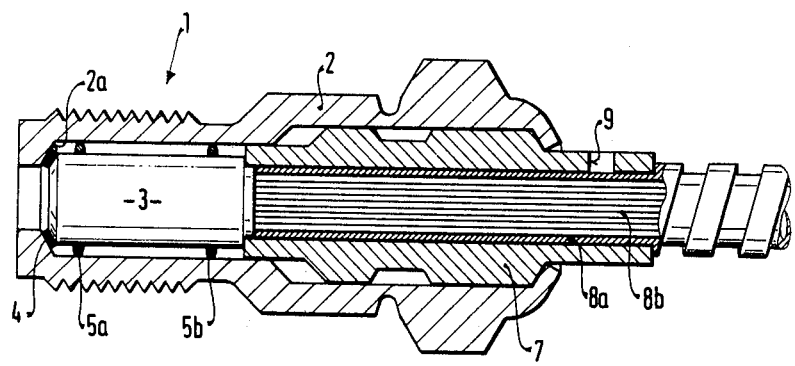
FIG. 1 is an axial schematic sectional view through a sensor.

A sensor 1—see FIG. 1—has a housing 2 with a screw thread thereon and a hexagonal head to receive a hexagonal socket, similar to a spark plug, for example. The outside of the housing may, additionally, be formed with suitable sealing grooves and lips, grooves to permit shrinkfitting of components, for stiffening ribs, cooling fins, and the like. The external configuration of the housing, thus, can be standard and similar to a spark plug.

In accordance with the invention, a quartz-glass rod 3 is retained within the housing. The quartz-glass rod 3 has its combustion side end chamfered to form a frusto-conically converging surface. The remote or sensing end of the quartz-glass rod 3 has a ring-shaped shoulder ground thereon. The working of the quartz-glass rod 3 at the two opposite ends permits easy breaking off of the rod element 3 from a long cane or rod of quartz-glass, without any further working of the quartz-glass itself.

The chamfered surface of the quartz-rod 3 is fitted against a sealing ring 4 secured to an inturned shoulder of the housing 2. The quartz-glass rod 3 has an outer diameter less than the diameter of the opening in the housing 2. It is retained centrally within the opening in the housing 2 by spacer rings 5a, 5b and/or by a filling of a suitable powder, such as talcum, graphite, spinel, or the like. The powder 6 is show in FIG. 2 and may be used together with the spacer rings 5a, 5b. The spacer rings provide for centering and holding the quartz-glass rod 3 reliably in position, secure against breaking. The quartz-glass rod 3 is sealed to the housing by axial pressure applied by an abutment sleeve 7 which fits against the ring-shaped shoulder at the sensing end of the quartz-glass rod 3. The abutment sleeve 7 is formed with an external shoulder which is held in position by a rolled-over end portion of the housing 2—see FIG. 1. Additionally, and is desired, a washer or ring of metal or a plastic can be interposed between the abutment sleeve 7 and the shoulder on the quartz-glass rod 3 in order to provide for a soft, shock-absorbent transition of the engagement between the sleeve 7 and the rod 3.

A light guide cable 8b which, preferably, is flexible and is formed of a bundle of light guide filaments, is in light transmissive position, e.g. contact with the end portion of the quartz-glass rod 3. The outer part of the light guide cable preferably is covered by a metal spiral sleeve; the portion of the light guide within the abutment sleeve 7 is surrounded by a sleeve 8a. The light guide cable 8b and the surrounding sleeve 8a are secured to the abutment sleeve 7 in any well known and suitable manner, for example by means of a set screw tapped through an opening 9 in the abutment sleeve 7. Other ways of securing the light guide cable may be used.

Figure 2:
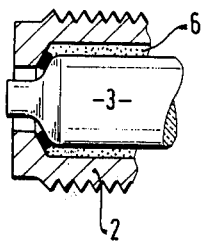
FIG. 2 is a fragmentary axial section through the end portion of the sensor and illustrating another embodiment.

FIG. 2 illustrates a variation in which the combustion chamber end portion of the quartz-glass rod 3 is extended and formed with a tip of reduced diameter extending through the outer open end of the housing 2. The region of reduced diameter passes through the opening beyond the inturned shoulder 2a, flush with the end of the housing or even extending slightly therebeyond. The end portion of the quartz-glass rod 3 which extends into the combustion chamber will become very hot; the heat may reach a temperature resulting in burning-off any combustion residue which might deposit on the quartz-glass rod 3; thus, the quartz-glass rod 3 is "self-cleaning" by burning-off of residue; only a minimum of residue will actually eventually remain.

Operation: The sensor is screwed through a suitable tapped opening in the cylinder head of an IC engine. The light which will be generating upon ignition and during the combustion processes occurring in the combustion chamber is passed through the quartz-glass rod 3 into the light guide cable 8b for further transmission to an evaluation circuit or system, not shown, and which may be in accordance with any such system suitable to determine engine knocking, or for analysis of combustion processes, in general. Reference is made to the co-pending application.

The sensor arrangement utilizes the temperature characteristics of quartz-glass, with a minimum of working of the quartz-glass element. Additionally, technology which is well known in connection with spark plug manufacture can be used, particularly when making the abutment element 7 and the housing 2, so that manufacture of such an element is inexpensive and can be carried out by well-known methods with available production equipment.

Various changes and modifications may be made, and features described in connection with one of the embodiments may be used with the other, within the scope of the inventive concept.

In a typical example, the diameter of the quartz-glass rod 3 was 7 mm. The sealing ring 4 was made of copper. The opening in the end portion of the housing was 5 mm diameter; the spacer rings 5a, 5b were made of copper. The relative dimensions of FIG. 2 are drawn approximately to scale with respect to the quartz-glass rod 3.

What is claimed is:

1. Combustion process sensor structure to determine physical processes occurring in the combustion space of a combustion chamber in an internal combustion engine, having a tubular housing (2) having a central opening;

a light guide cable (8b) extending into the opening of the housing;

a quartz-glass rod (3) located in the opening of the housing, said housing comprising an inwardly extending shoulder (2a) formed on one end portion of the housing to receive and support a first end portion of the quartz-glass rod facing the combustion chamber;

a sealing ring interposed between the first end portion of the quartz-glass rod and said inwardly extending shoulder;

and an abutment sleeve (7) bearing against the other end portion of the quartz-glass rod, received and secured in fixed axial position within the housing to thereby retain the quartz-glass rod in position in the housing and in sealing engagement with said sealing ring (4), the light guide cable (8b) extending through the abutment sleeve (7) and being retained therein and positioned in light-transmitting relationship with respect to the other end portion of the quartz-glass rod (3).

2. Sensor structure according to claim 1, wherein the opening in the housing is of predetermined diameter and extends towards the combustion chamber;

and the quartz-glass rod (3) has a portion of reduced diameter fitting, with clearance, through said opening and extending beyond said inwardly extending shoulder.

3. Sensor structure according to claim 1, wherein the end portion of the quartz-glass rod facing said inwardly extending shoulder is chamfered.

4. Sensor structure according to claim 1, further including spacer rings (5a, 5b) centrally locating the quartz-glass rod (3) within the wall delimiting the opening in the housing (2).

5. Sensor structure according to claim 4, further including a pulverized or powdery filler material (6) positioned between the quartz-glass rod (3) and the wall delimiting the opening of the housing (2) within which the quartz-glass rod is received.

6. Sensor structure according to claim 1, further including a pulverized or powdery filler material (6) positioned between the quartz-glass rod (3) and the wall delimiting the opening of the housing (2) within which the quartz-glass rod is received.

7. Sensor structure according to claim 1, further including a holding sleeve (8a) surrounding the light guide cable (8b) in the region of the abutment sleeve;

and attachment means (9) securing said holding sleeve and said cable within the abutment sleeve.

8. Sensor structure according to claim 1, wherein said sealing ring (4) comprises a copper ring.

9. Sensor structure according to claim 1, further including spacer rings (5a, 5b) centrally locating the quartz-glass rod (3) within the inner wall delimiting the opening in the housing (2);

and wherein said sealing ring (4) and said spacer rings (5a, 5b) comprise copper rings.

10. Sensor structure according to claim 9, further including a pulverized or powdery filler material (6) positioned between the quartz-glass rod (3) and the wall delimiting the opening of the housing (2) within which the quartz-glass rod is received.

11. Sensor structure according to claim 1, further including spacer rings (5a, 5b) which comprise copper rings, centrally locating the quartz-glass rod (3) within the wall delimiting the opening in the housing.

12. Sensor structure according to claim 11, further including a pulverized or powdery filler material (6) positioned between the quartz-glass rod (3) and the wall delimiting the opening of the housing (2) within which the quartz-glass rod is received.

13. Sensor structure according to claim 1, wherein the quartz-glass rod (3) has a maximum outer diameter which is less than the diameter of the opening, leaving a space between the outer surface of the quartz-glass rod and the wall delimiting the opening of the housing;

and means (5a, 5b; 6) positioning the quartz-glass rod centrally in the opening.

14. Sensor structure according to claim 13, wherein said central positioning means comprises spacer rings (5a, 5b).

15. Sensor structure according to claim 14, wherein said spacer rings are copper rings.

16. Sensor structure according to claim 13, wherein said means positioning the quartz-glass rod comprises a pulverized or powdery filler material (6) positioned between the quartz-glass rod and the inner wall delimiting the opening of the housing.

17. Sensor structure according to claim 13, wherein said means positioning the quartz-glass rod centrally in the opening comprises spacer rings (5a, 5b) and pulverized or powdery filler material (6) positioned between the quartz-glass rod (3) and the inner wall delimiting the opening of the housing.

18. Sensor structure according to claim 17, wherein said spacer rings are copper rings.

* * * * *